COMPLEMENTARY FIELD-EFFECT TRANSISTOR TRANSMISSION GATE

Filed Dec. 21, 1965

INVENTORS
JOSEPH R. BURNS &
J. JAMES GIBSON
BY John V. Regan
Attorney

United States Patent Office 3,457,435

Patented July 22, 1969

3,457,435

COMPLEMENTARY FIELD-EFFECT TRANSISTOR TRANSMISSION GATE

Joseph R. Burns, Trenton, and John James Gibson, Princeton, N.J., assignors to Radio Corporation of America, a corporation of Delaware Filed Dec. 21, 1965, Ser. No. 515,413
Int. Cl. H03k *17/60*
U.S. Cl. 307—251 9 Claims

ABSTRACT OF THE DISCLOSURE

A pair of field-effect transistors of opposite conductivity type have their source-drain paths connected in parallel. Signals of opposite polarity sense are applied at the gates of the transistors to bias both on or both off simultaneously.

This invention relates to transmission gates and, in particular, to an improved transmission gate which employs field-effect transistors.

Transmission gates are employed, for example, to selectively gate information or other signals from one point to another along a transmission path. When a single field-effect transistor is used as the transmission gate, a problem arises due to the fact that the transmission characteristics of such a transistor differ according to the information being transmitted. By way of example, when digital signals are being transmitted, the gating transistor may operate as a grounded, or common, source transistor for one value of digital signal. For the other value of digital signal, the transistor may operate as a source follower. In the latter instance, the voltage transmitted to the receiving point does not reach the full value of the sending voltage because of the threshold characteristic of the transistor. Depending upon the value of the conduction threshold of the transistor, the voltage actually transmitted to the receiving point may be insufficient to trigger or otherwise produce proper operation of the circuit or element connected at the receiving point. A more serious problem is that a longer period of time is required for the voltage transmitted to the receiving point to reach the threshold value of the receiving element than would be required if the full sending voltage were actually transmitted to the receiver. As a result, a limitation is imposed on the overall speed of operation of the system and, in particular, the repetition rate of the various circuits and/or devices is reduced.

Accordingly, it is one object of this invention to provide an improved transmission gate.

It is another object of this invention to provide an improved transmission gate which employs field-effect transistors.

Still another object of this invention is to provide an improved transmission gate employing two field-effect transistors of opposite conductivity type, in which the transmission characteristics of the gate are the same regardless of the direction of current flow through the gate or the value of the signals being transmitted.

A further object of this invention is to provide an improved transmission gate which may be operated selectively to transmit the full sending voltage to a receiving point.

Briefly stated, the improved transmission gate comprises a pair of field-effect transistors of opposite conductivity type having their conduction paths connected in parallel with each other between the sending point and the receiving point in the transmission path. Signals are applied selectively at the gates of these transistors to either render both transistors conducting at the same time or nonconducting at the same time.

In the accompanying drawing, like reference characters denote like components, and:

Figure 1:
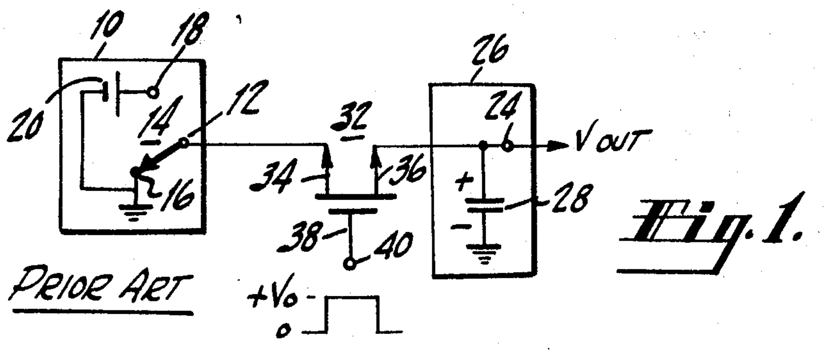
FIGURE 1 is a schematic diagram of a prior art transmission gate arrangement.

FIGURE 1 is a schematic diagram illustrating a known transmission gate arrangement. An input or sending source, represented by box 10, produces singals at its output terminal 12. The input source is illustrated, by way of example, as a switch 14 having a switch arm which may be connected either to a terminal 16 or to a terminal 18. Terminal 16 is connected directly to ground, and terminal 18 is connected to the positive terminal of a battery 20, the negative terminal of the battery being grounded. Depending upon the setting of the switching arm, the output of the device, at sending point 12, may be a voltage level of either ground potential or $+V_0$ volts, where $V_0$ is the value of battery 20. It is desired to transmit the voltage appearing at sending point 12 selectively to a receiving terminal 24 of an output unit 26. The load at the receiving terminal 24 is illustrated as a capacitor 28.

A transmission gate comprising an N-type field-effect transistor 32 has one of its source and drain electrodes 34 connected to the sending terminal 12 and has the other one of its source and drain electrodes 36 connected to the receiving terminal 24. The gate electrode 38 of the field-effect transistor is connected to a terminal 40, to which is applied a control signal having a potential of either zero volts or $+V_0$ volts.

The field-effect transistor 32 may be, for example, as MOS transistor or a thin film transistor of the insulated-gate type. For the particular values of voltage illustrated in FIGURE 1, such a transistor would be one of the enhancement type. For other values of voltage, the transistor could be one of the depletion type, and could even be a unipolar transistor. The characteristics of MOS and TFT transistors are well known in the art and will not be described. Suffice it to say that such devices are bidirectional in the sense that current can flow in either direction in the conduction path defined by the source and drain electrodes. For an N-type transistor, the source electrode generally is taken to be that electrode out of which the current flows, in the conventional sense. As will become apparent, the electrode 36 may be considered the source electrode for one value of input voltage applied at receiver terminal 12, and may be considered to be the drain electrode for the other value of input voltage.

It is desired in some cases, and essential in other cases, that the full voltage at sending terminal 12 be transmitted to, and appear at, the receiving terminal 24. A disadvantage of a single field-effect transistor used as a transmission gate is that the full input voltage is not transmitted to the sending terminal for some operating conditions, as will now be described.

Let it be assumed that capacitor 28 is initially charged in the polarity direction indicated adjacent the capacitor. Let it be assumed further that the movable arm of the switch 14 is connected to the grounded terminal 16. Transistor 32 is biased off when its gate voltage is at ground potential. When the control voltage at gate electrode 38 is then changed to $+V_0$ volts, transistor 32 is rendered conducting. For the voltage conditions given, the transistor 32 operates as a grounded source transistor, wherein electrode 34 is the source electrode and electrode 36 is the drain electrode. Because the source is grounded directly, as constant potential differential of $V_0$ volts exists between the source electrode 34 and the gate electrode 38, and the transistor remains biased in a low impedance (high conductivity) state so long as the switch and gate voltages remain at these values. Therefore, capacitor 28 is able to fully discharge through the conduction path of the transistor 32, and the voltage at receiving terminal 24 will go to ground potential. Thus, for this type operation of the transmission gate 32 the full voltage at the sending terminal 12 is transmitted to the receiving terminal 24.

At the end of the transmission period, the control voltage at gate electrode 38 is changed from $+V_0$ volts to ground potential, and transistor 32 then becomes nonconducting. Let it be assumed now that the movable switch arm is shifted into contact with terminal 18. The voltage at sending terminal 12 then is $+V_0$ volts. During the next gating period the control voltage at gate electrode 38 is again changed to $+V_0$ volts. It will be noted that the voltage at gate electrode 38 has the same value as the voltage at electrode 34, whereas the initial voltage at electrode 36 is zero volts. Accordingly, transistor 32 now operates as a source follower, with electrode 36 functioning as the source electrode and electrode 34 functioning as the drain electrode. A volt-ampere characteristic 46 for the transistor 32 operating under these conditions is illustrated in FIGURE 2.

Figure 2:
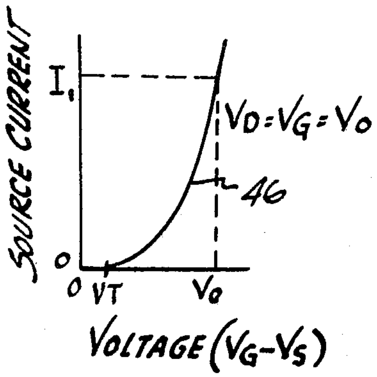
FIGURE 2 is a typical volt-ampere characteristic of an insulated-gate field-effect transistor.

In FIGURE 2, the voltage differential between source and gate is plotted along the abscissa. Since the drain electrode 34 and gate electrode 38 are at the same potential, the voltage plotted along the abscissa also is equal to the input voltage at sending terminal 12 minus the output voltage at receiving terminal 24. Source current is plotted along the ordinate.

When transistor 32 is initially rendered conductive, the output voltage (or source voltage) is at ground potential, and a differential of $V_0$ volts exists between source and gate. Initially, therefore, a source current $I_1$ flows in the transmission path, as may be seen in FIGURE 2. As capacitor 38 charges, the potential difference between source and gate decreases, whereby the source current also decreases, again as illustrated in FIGURE 2. When the capacitor 28 has charged to a value of $V_0$–$V_T$ volts, where $V_T$ is the threshold voltage required for conduction in the transistor, transistor 32 becomes nonconducting and the capacitor 28 charges no further.

In summary of this type operation, it may be said that when transmission gate transistor 32 operates as a source follower, the capacitor 28 cannot charge to the full value of the sending voltage. Rather, the signal voltage at the receiving terminal 24 reaches a value which is equal to the sending voltage minus the conduction threshold voltage of the transistor. For a typical insulated-gate field-effect transistor of the enhancement type, the threshold voltage may be two or three volts. Assuming that $V_0$ equals ten volts, this means that the signal voltage reached at the receiving terminal 24 is only seven or eight volts, and the full sending voltage has not been transmitted.

When the transmission gate is used to transfer signals in digital circuits, it may happen that the signal voltage reached at the receiving terminal 24, in the source follower mode of operation, is insufficient to trigger, switch, or otherwise effect proper operation of a circuit connected at the receiving terminal. Even assuming that this value of voltage is sufficient, a more important disadvantage of the type operation described is that a longer period of time is required for the voltage at receiving terminal 24 to reach a value sufficient to operate the circuitry thereat than would be required if the full $V_0$ volts were transmitted to the receiving terminal. This result may be better understood from a consideration of the waveforms in FIGURE 3.

Figure 3:
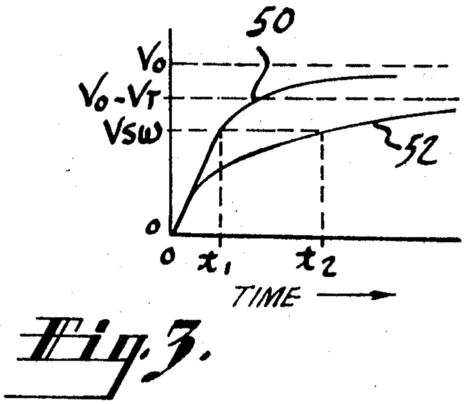
FIGURE 3 is a set of waveforms of output voltage versus time for different operating conditions of a field-effect transistor.

In FIGURE 3, time is plotted along the abscissa, and voltage at the receiving terminal 24 is plotted along the ordinate. Waveform 50 is the characteristic for voltage versus time when the full $V_0$ volts is transmitted from the sending terminal 12 to the receiving terminal 24. Characteristic 52 is the waveform of voltage versus time for the condition described above in connection with FIGURE 1, wherein the final signal voltage reached at the receiving terminal is $V_0$–$V_T$. As may be seen in FIGURE 3, the receiving terminal 24 reaches a value of $+V_{SW}$ volts at a time $T_1$ when the full $V_0$ volts is transmitted to the receiving terminal. However, the voltage at the receiving terminal does not reach a value $V_{SW}$ until a time $T_2$ for the transistor operating in the source follower mode. The time $T_2$ may be, for example, three times as great as the time $T_1$. If $V_{SW}$ is the switching voltage, i.e. the voltage required at the receiving terminal 24 to operate the circuit connected thereto, it may be seen that there is a considerable delay between the time that transistor 32 is rendered conducting and the time that the output circuit becomes operative. This means that the overall circuitry has a much lower repetition rate than would be possible if the full $+V_0$ volts were transmitted to the receiving terminal 24.

Figure 4:
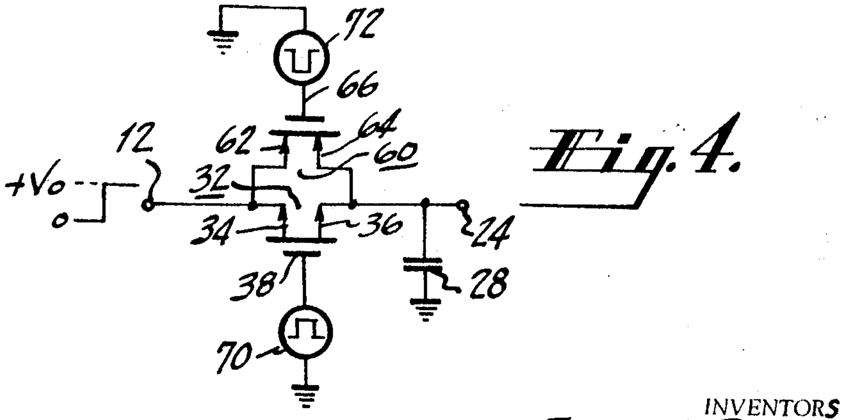
FIGURE 4 is a schematic diagram of a transmission gate embodying the invention.

The aforementioned limitations and disadvantages of the single transistor gate are overcome by the improved transmission gate of our invention. This improved gate is illustrated schematically in FIGURE 4. In FIGURE 4, the N-type field-effect transistor 32 is connected between the sending terminal 12 and the receiving terminal 24 in the same manner as in the FIGURE 1 circuit. In addition, a second field-effect transistor 60 of the opposite conductivity type, namely P-type, has its conduction path connected in parallel with the conduction path of first transistor 32. In particular, transistor 60 has a source electrode and a drain electrode which define a conduction path. One of these electrodes 62 is connected directly to the electrode 34 of first transistor 32, and the other one of the source and drain electrodes 64 is connected to the other electrode 36 of first transistor 32. The gate electrode 38 of transistor 32 is connected to a first source 70 of control signals, and the gate 66 of second transistor 60 is connected to a source 72 of control signals.

Sources 70 and 72 are operative to apply gating signals of opposite phase concurrently at the gate electrodes 38 and 66, respectively. The signals supplied by these sources are of such amplitude and polarity that both of the transistors 32 and 60 are rendered conducting concurrently and are rendered nonconducting concurrently. By way of example, when the transmission gate is used in a digital system in which the digital signals have values of zero volts and $+V_0$ volts, control signal source 70 applies a voltage of ground potential at gate electrode 38 as the other source 72 concurrently applies a voltage $+V_0$ volts at the gate electrode 66. Correspondingly, when source 70 applies a voltage of $+V_0$ volts at gate electrode 38, source 72 applies ground potential at gate electrode 66. In terms of conventional digital terminology, the outputs of the sources 70 and 72 are the complements of one another.

Consider now the operation of the improved transmission gate, and assume that capacitor 28 is initially uncharged and that the voltage applied at sending terminal 12 has a value of $+V_0$ volts. When it is desired to gate the voltage from the sending terminal to the receiving terminal, source 70 applies a voltage of $+V_0$ volts at gate 38, and source 72 applies ground potential at gate 66. Transistor 32 operates as a source follower, and current flows, in the conventional sense from the sending terminal 12 to the receiving terminal 24 to charge the capacitor 28. Concurrently therewith, second transistor 60 operates in the common source mode, since the gate 66 is at ground potential and the source electrode 62 is at $+V_0$ volts. First transistor 32 becomes nonconducting when the charge on capacitor 28 reaches a value of $V_0$–$V_T$ volts, for reasons previously discussed in connection with the FIGURE 1 circuit. However, since second transistor 60 operates in the common source mode, transistor 60 continues to be biased in the on condition irrespective of the charge on capacitor 28. Accordingly, second transistor 60 continues to provide a low impedance transmission path for current flow from sending terminal 12 to receiving terminal 24, and allows the capacitor to charge to the full $+V_0$ volts, whereby the full sending voltage is received at the output, or receiving, terminal 24.

At the termination of the transmission or gating period, transistor 32 is turned off by source 70 and transistor 60 is biased off by source 72. Assume now that the sending voltage at terminal 12 changes from $+V_0$ volts to ground potential. During the next gating period, both of the transistors are again rendered conducting by their respective control signal sources 70 and 72. Second transistor 60 now operates as a source follower, with electrode 64 being the source and electrode 62 being the drain. This transistor provides a conduction path for discharging capacitor 28 until the voltage at output terminal 24 falls to a value of $V_T$ volts, where $V_T$ is the conduction threshold of transistor 60. However, first transistor 32 is now operating in the grounded source mode, whereby this transistor remains biased on so long as the voltage at sending terminal 12 is at ground potential and the voltage at ground electrode 32 is at $+V_0$ volts. Consequently, first transistor 32 provides a low impedance path for the complete discharge of capacitor 28.

In summary of the FIGURE 4 circuit, the transmission gate is operative to transmit the full voltage from the sending terminal 12 to the receiving terminal 24 regardless of the sending voltage. The combined operation of the two transistors accomplishes the full transmission of the sending voltage to the receiving terminal 24 for either input condition and, more important, permits the voltage at the receiving terminal 24 to change at a much faster rate than could be accomplished with a single transistor. More specifically, the voltage versus time characteristic for the FIGURE 4 circuit may be represented by the characteristic curve 50 of FIGURE 3, whereas the characteristic for a single transistor is given by the characteristic 52 of FIGURE 3.

By way of example only of the uses for a transmission gate of the type described, this gate may be used in the cross coupling network of an insulated-gate field-effect transistor flip-flop, or in the input gating network thereto. As is known, an insulated-gate field-effect transistor has a very high input impedance, and little or no current flows in the input circuit thereof. Such a transistor, when considered as a load, may be represented as a capacitor, such as the capacitor 28 in FIGURES 1 and 4.

What is claimed is:

1. The combination comprising:

a first field-effect transistor of one conductivity type having first and second electrodes defining a conduction path, and having a gate electrode for controlling the conductivity of said path;

a second field-effect transistor of the opposite conductivity type having first and second electrodes defining a conduction path, and having a gate electrode;

means connecting the conduction path of the first transistor across the conduction path of the second transistor; and means for applying signals at the gates of the first and second transistors to render both transistors conducting concurrently and nonconducting concurrently.

2. The combination as claimed in claim 1, wherein the signals applied at the gates of the first and second transistors are the complements of one another.

3. The combination as claimed in claim 1, wherein the signals applied at the gates of the first and second transistors are digital signals having either a first value or a second value, and wherein a signal of the first value is applied to the gate of the first transistor when a signal of the second value is applied to the gate of the second transistor, and vice-versa.

4. The combination as claimed in claim 1, including a signal sending point, a signal receiving point, and means connecting the parallel connected conduction paths of the first and second transistors between said signal sending point and said signal receiving point.

5. The combination as claimed in claim 4, including means for varying the voltage at said signal sending point between a first value and a second value.

6. The combination as claimed in claim 5, wherein the signals applied at the gates of the first and second transistors have either the first value or the second value, and wherein a signal of the first value is applied at the gate of the first transistor when a signal of the second value is applied at the gate of the second transistor, and vice-versa.

7. The combination as claimed in claim 6, wherein the first and second transistors are insulated-gate field-effect transistors, and wherein one of the transistors is a P-type transistor and the other transistor is an N-type transistor.

8. A transmission gate comprising:

two field-effect transistors of different conductivity types, each having a conduction channel terminated at one end in a source electrode and at the other end in a drain electrode, said two channels being connected in parallel; and means for concurrently causing one transistor to operate as a source follower and the other in the common source mode.

9. The invention set forth in claim 8, further including a capacitive load connected to the end of one transmission path and a signal input terminal at the other end of said transmission path.

References Cited

UNITED STATES PATENTS

| | | | |
|---|---|---|---|
| 3,077,545 | 2/1963 | Rywak | 307—255 X |
| 3,327,133 | 6/1967 | Sickles | 307—251 |

DONALD D. FORRER, Primary Examiner

U.S. Cl. X.R.

307—205, 246, 304